United States Patent
Mayerle et al.

(12)

(10) Patent No.: US 6,378,619 B2
(45) Date of Patent: Apr. 30, 2002

(54) AGRICULTURAL GROUND WORKING IMPLEMENT WITH HYDRAULIC DOWNPRESSURE CIRCUIT

(75) Inventors: Dean J. Mayerle; David R. Hundeby, both of Saskatoon (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/897,874

(22) Filed: Jul. 3, 2001

Related U.S. Application Data

(62) Division of application No. 09/428,527, filed on Oct. 28, 1999, now Pat. No. 6,302,220.

(30) Foreign Application Priority Data

Oct. 30, 1998  (CA) .............................................. 2252293

(51) Int. Cl.⁷ ............................................ A01B 59/043
(52) U.S. Cl. ............................ 172/2; 172/637; 172/459
(58) Field of Search ........................... 172/459, 2, 448, 172/439, 637, 311, 456, 634, 640, 666; 701/50

(56) References Cited

U.S. PATENT DOCUMENTS 5,687,798 A * 11/1997 Henry et al. ................. 172/311
6,044,916 A *  4/2000 Hundeby ..................... 172/448

FOREIGN PATENT DOCUMENTS

CA          2210238         10/1998

* cited by examiner

*Primary Examiner*—Christopher J. Novosad
(74) *Attorney, Agent, or Firm*—Larry W. Miller; John William Stader

(57) ABSTRACT

An agricultural implement includes a frame having a pair of tool-carrying wings pivotally mounted thereon for pivotal movement between raised transport positions and lowered ground-working positions. Each wing has a hydraulic wing actuator connected thereto which is extendable and retractible for effecting the pivotal motion. A hydraulic wing actuator circuit is connected to each of the wing actuators, which circuit, when connected to a tractor hydraulic system, enables the wing actuators to apply down pressure to said wings when the wings are in the lowered working positions. A hydraulic pressure control valve system controls the down pressure exerted by the wing actuators.

16 Claims, 6 Drawing Sheets

AGRICULTURAL GROUND WORKING IMPLEMENT WITH HYDRAULIC DOWNPRESSURE CIRCUIT

CROSS REFERENCE TO RELATED APPLICATIONS

This application is a divisional application of U.S. Application Ser. No. 09/428,527, filed Oct. 28, 1999, now U.S. Pat. No. 6,302,220 B1. The entirety of this application is incorporated herein by reference.

BACKGROUND OF THE INVENTION

This invention relates to winged implements in which the wings are biased by a hydraulic downpressure circuit to pivot toward the ground during operation to provide force onto the ground working tools so that they better penetrate hard ground to the set working depth.

An earlier form of downpressure system shown in Flexi-coil's U.S. Pat. No. 5,687,798 uses PRRV (pressure reducing-relieving valve) as controls in the downpressure circuit. A related system is shown in Flexi-coil's Patent Application (U.S. Ser. No. 08/891,204, corresponding to Canadian 2,210,238.

Recent tractor designs include hydraulic systems on the tractors that are CCLS (closed center load sensing) systems. These systems attempt to maintain a set flow volume through each of the tractor valves, when open. This volume can be set by the operator. The tractor hydraulic pump is controlled such that it will increase the system pressure until the flow volume at each of the open valves is satisfied. This system allows for efficiency to be gained form previous systems in which the pump volume output was reduced only after full pressure capability had been reached. Circuits connected to the tractor that have PRRV controls, will only accept flow when the PRRV senses a requirement for flow in the circuit connected downstream of the valve. A tractor having CCLS controls will attempt to deliver flow in any case, and the tractor pump will raise the pressure to the system maximum. This not only diminishes the efficiency of downpressure circuit which is causing the problem, but also diminishes the efficiency of any of the circuits being operated because the tractor control system introduces pressure drops at each valve to maintain only the set flow.

SUMMARY OF THE INVENTION

It is an object of the invention to provide a downpressure circuit for an agricultural implement having ground working devices mounted thereon.

It is another object of this invention to reduce negative effects caused by agricultural implements having downpressure circuits on CCLS tractor hydraulic systems.

It is a feature of this invention that the efficiency losses on CCLS tractor hydraulic systems that may be introduced by connecting other downpressure circuits are reduced.

This invention relates to an agricultural implement including a frame having a pair of tool-carrying wings pivotally mounted thereon for pivotal movement between raised transport positions and lowered ground-working positions, each said wing having a hydraulic wing actuator connected thereto which is extendable and retractable for effecting said pivotal motion, and a hydraulic wing actuator circuit connected to each of said wing actuators, which circuit, when connected to a tractor hydraulic system, enables said wing actuators to apply down pressure to said wings when the wings are in the lowered working positions, and hydraulic pressure control valve means for controlling the down pressure exerted by said wing actuators.

In one preferred feature of the invention said pressure control valve means comprises at least one pressure relief valve.

In one form of the invention a hydraulic top link actuator is secured to said implement frame and adapted to be interposed between said implement frame and another vehicle to apply down pressure to the implement frame.

As a further feature of the invention said hydraulic top link actuator is preferably connected to a portion of the wing actuator circuit.

In another form of the invention a pair of said relief valves are provided to enable the down pressures exerted by said wing actuators and top link actuator to be controlled separately.

The agricultural implement typically includes an implement lift hydraulic circuit adapted to be connected to a lifting system for the implement. Advantageously, the system may include a valve to disable the down pressure action of the top link actuator when the implement lift circuit is activated to raise the implement.

The agricultural implement may preferably include a valve responsive to wing position to disable the pressure relief valve associated with the wing actuators when the wings are raised upwardly beyond the working positions.

As a further preferred feature the agricultural implement includes a flow divider in said wing actuator circuit to allow the connection of another branch circuit to the same tractor control to maintain constant flow to each branch regardless of varying pressure in either branch or between branches.

These and other objects, features and advantages are accomplished according to the invention by providing an agricultural implement including a frame having a pair of tool-carrying wings pivotally mounted thereon for pivotal movement between raised transport positions and lowered ground-working positions. Each wing has a hydraulic wing actuator connected thereto which is extendable and retractible for effecting the pivotal motion. A hydraulic wing actuator circuit is connected to each of the wing actuators, which circuit, when connected to a tractor hydraulic system, enables the wing actuators to apply down pressure to said wings when the wings are in the lowered working positions. A hydraulic pressure control valve system controls the down pressure exerted by the wing actuators.

DETAILED DESCRIPTION OF THE PREFERRED EMBODIMENT

Figure 1:
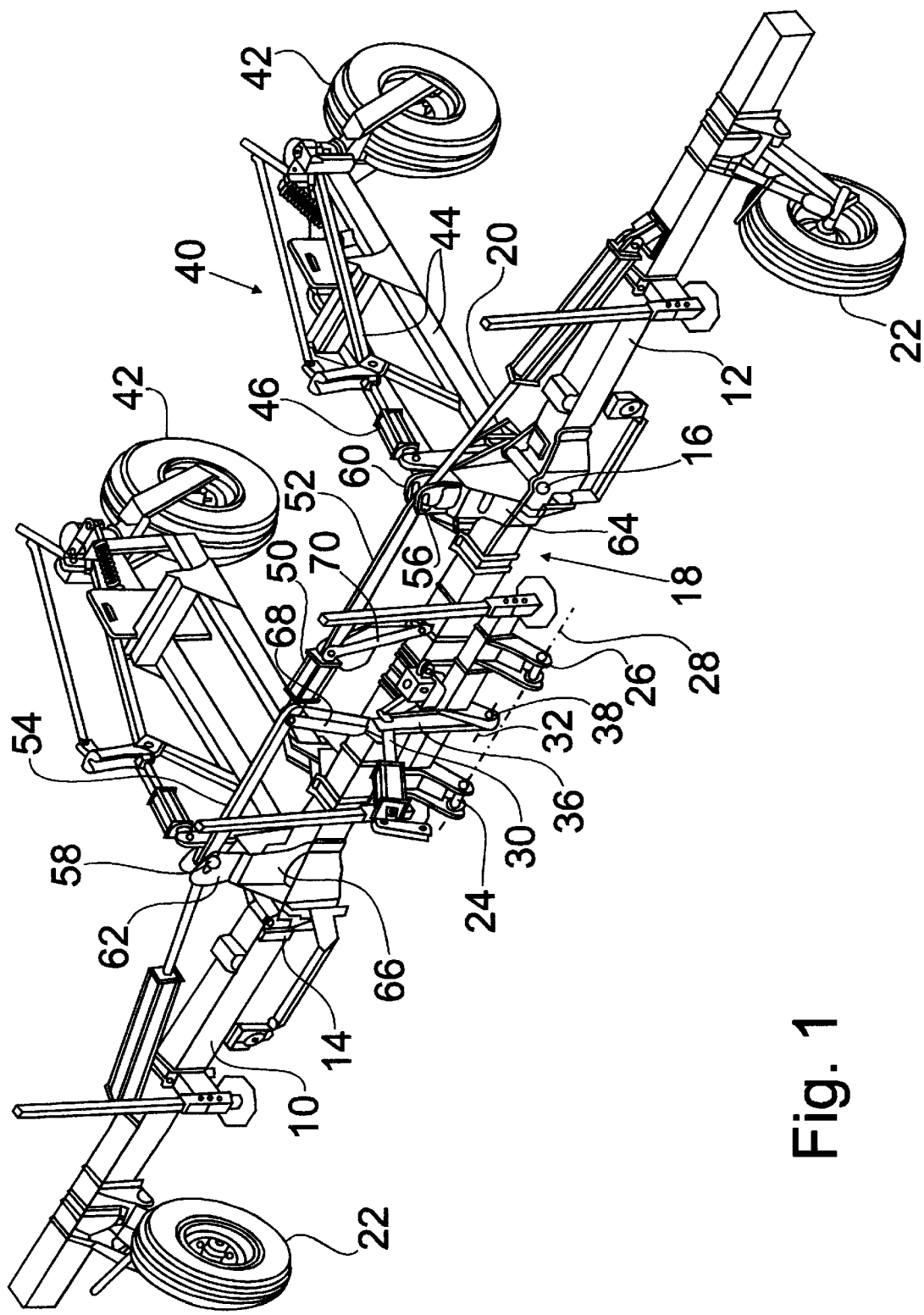
FIG. 1 shows a perspective view of a winged implement in which the actuator and downpressure system are incorporated.

Referring to FIG. 1, a first embodiment of the implement has wing sections 10 and 12 pivotally attached via joints 14 and 16 to a frame middle section 18 for carrying suitable ground working tools (not shown), which joints each have an axis that is oriented generally horizontal in the working position so that the wing sections are allowed pivotal movement over uneven ground. In the headland position shown in FIG. 1, the wing sections 10 and 12 are supported generally horizontally over the ground, suspended from the middle section 18 by their joints and by hydraulic wing actuators 20. No other means is supporting the wings in this position. When lowered to a working position, gauge wheels 22 support each wing above the ground. The gauge wheels 22 can be adjusted to set the working height above the ground for each wing section. The wing can thereby float (pivot freely) to follow ground contours, or it may be biased toward the ground, and the gauge wheel 22 will limit the downward motion. Downward biasing may be required in soil conditions in which ground engaging tools do not penetrate to the desired depth as set by the gauge wheel and the gauge wheel and wing section is suspended off the ground by the ground tools.

Points 24 and 26 for attachment to a three-point hitch are provided on the middle section 18 for towing and for controlling the height of the middle section. (Alternately the invention would work on implements having ground wheel means to support the middle section, with a floating or fixed hitch for towing). The hitch of the implement shown is particularly suited for connection to the three-point hitch of an aircart having double acting lower link actuators. Most three-point hitches on tractors or other implements provide only lifting action by the lower links and allow free upward movement of the links. The lower links of the aircart can be maintained in a fixed position. The implement middle section 18 is pivotally attached to the aircart lower links by connections at points 24 and 26 allowing the implement movement about a horizontal transverse axis 28.

A hydraulic top link 30 is pivotally connected at one end to the aircart (offset from the axis of the lower links), and at the second end is pivotally connected to the implement middle section 18 at a point offset from the horizontal axis 28. An intermediate link 32, is connected between the second end of the top link and the implement middle section by pivotal connections on both ends. The implement is allowed free downward pivotal movement about the horizontal axis 28 (limited by the length of the actuator and link 32, and by rear support assembly 40) but upward pivotal movement is limited by an abutment 36 along the intermediate link 32. The implement middle section 18 abuts the intermediate link at abutment 36 and the top link 30 reacts to the upward pivotal movement.

Figure 1A:
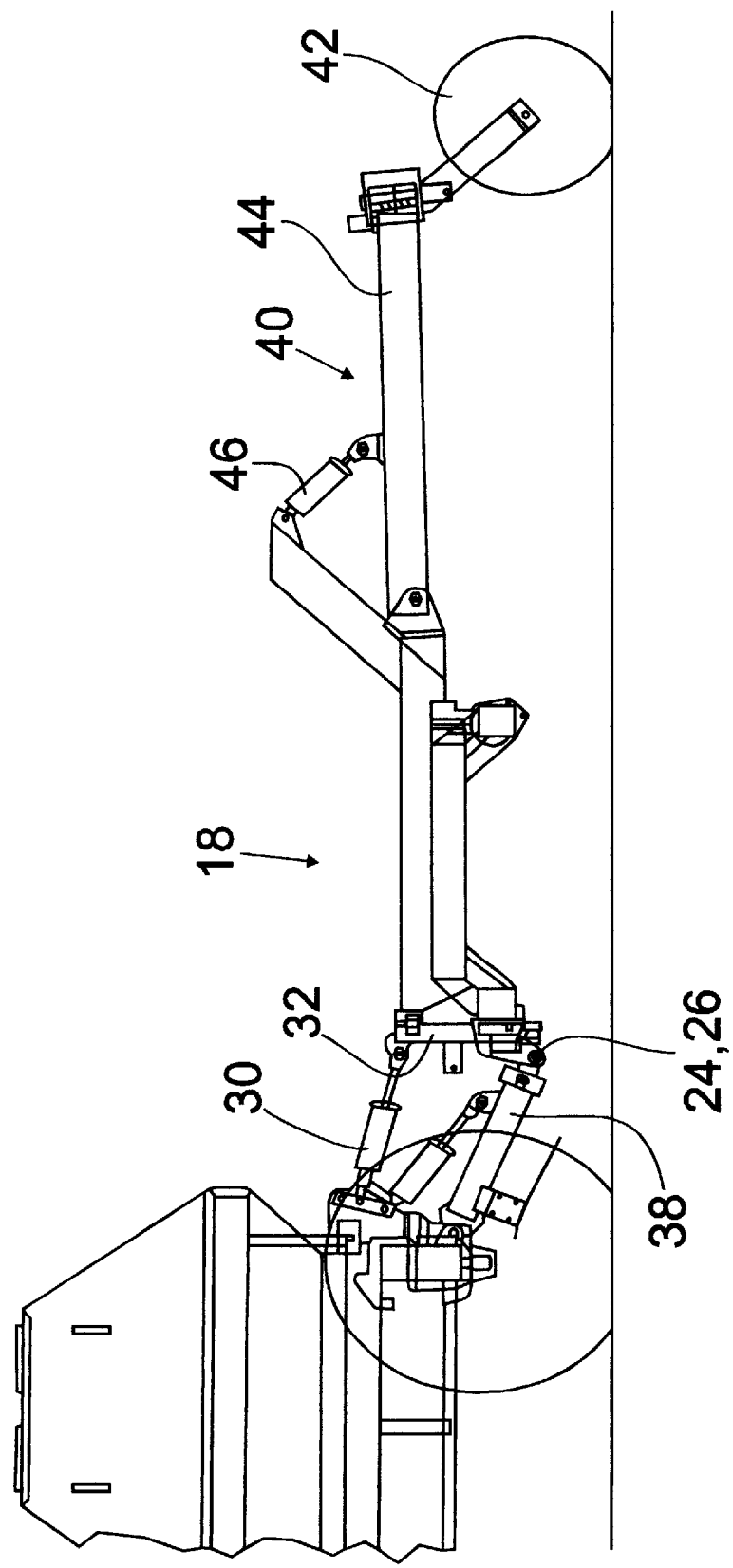
FIGS. 1A and 1B show in diagrammatic fashion the manner in which the implement is attached to the three point hitch of an aircart.
Figure 1B:
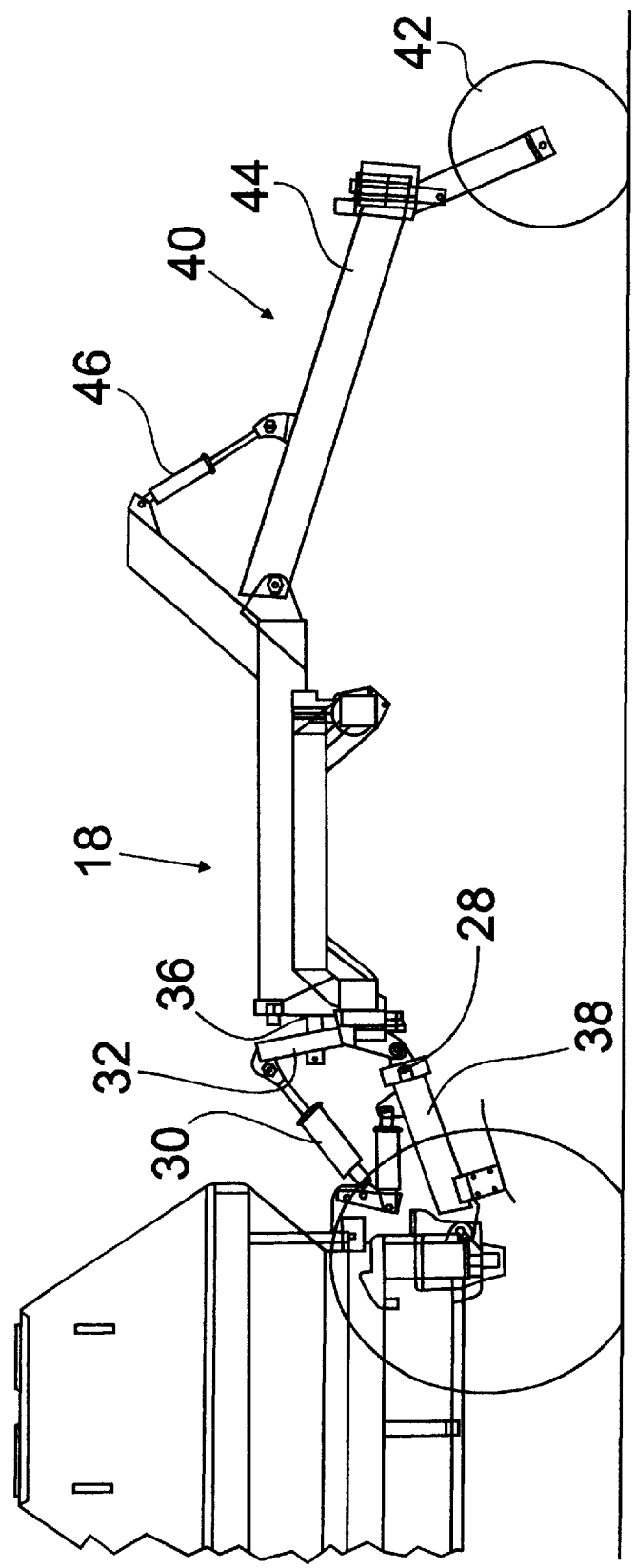

FIGS. 1A and 1B help to illustrate the above and they show the implement connected to an aircart by the preferred 3 point hitch with hydraulic top link 30 and intermediate link 32 in both working and raised positions. This shows how there is freedom of pivoting in the raised position, even though the top link 30 may be locked out, and therefore rigid. The intermediate link 32 is drawn away from the abutment 36, not by the top link but by the system geometry and during the raising action from the lower links 38 and rear support assembly 40. Rear support assembly 40 is well known per se and each includes a castored ground wheel 42 connected by linkages 44 to frame middle section 18. Actuator 46 effects movement of the linkages 44 during raising and lowering in a well known fashion.

Alternately a rigid top link (not shown) may be connected directly between the aircart and the implement, as in a conventional three point hitch. This is used on implements not having rear support assembly 40, so the rotation of the frame middle section 18 about the horizontal axis 28 is controlled, maintaining a generally constant relative orientation between the implement and the aircart as the implement is raised or lowered.

When a rear lift support assembly 40 is provided on the implement, a compressible top link is required so that the implement is allowed pivotal movement about axis 28. This may be a spring connected directly to the implement or via an abutting intermediate link 32. In the preferred embodiment the required compressible link is a hydraulic top link operated by a biasing pressure and an intermediate link is also a provided to create freedom to pivot in the transport position when hydraulic flow to the top link is blocked.

The top link 30 is locked out of the circuit by valve 48 (FIG. 4) when the implement is raised (by rear lift means and lower arms of hitch) and the link 32 pivots away from the frame middle section so it no longer abuts the frame. The geometry between the lower links 38 and top link 30 causes this action. This allows pivoting of the implement relative to the aircart about horizontal axis 28 when in transit over uneven ground.

Referring further to the embodiment of FIG. 1, the headland actuator system includes a headlands cylinder 50, having its opposite ends pivotally attached to elongated center links 52 and 54. The outer ends of links 52 and 54 are secured by pins 56, 58 to the inner ends of the wing actuators 20 and these pins are disposed for movement in slots 60 and 62 formed in the upper ends of spaced towers. 64, 66 fixed to the frame middle section 18. The headlands cylinder 50 is stabilized by means of stabilizing links 68, 70 having upper ends connected at opposing ends of the cylinder 50 and their lower ends pivoted to the middle section 18 of the implement frame. Thus, as cylinder 50 is extended and retracted, the inner ends of the wing actuators 20 are caused to travel along the paths defined by slots 60, 62 between the inner and outer extremities of these slots. (In an alternative arrangement an extra long headlands actuator could be used with its opposing ends being directly connected to the inner ends of the wing actuators 20 and eliminating the need for links 52 to 70 described above).

Figure 2:
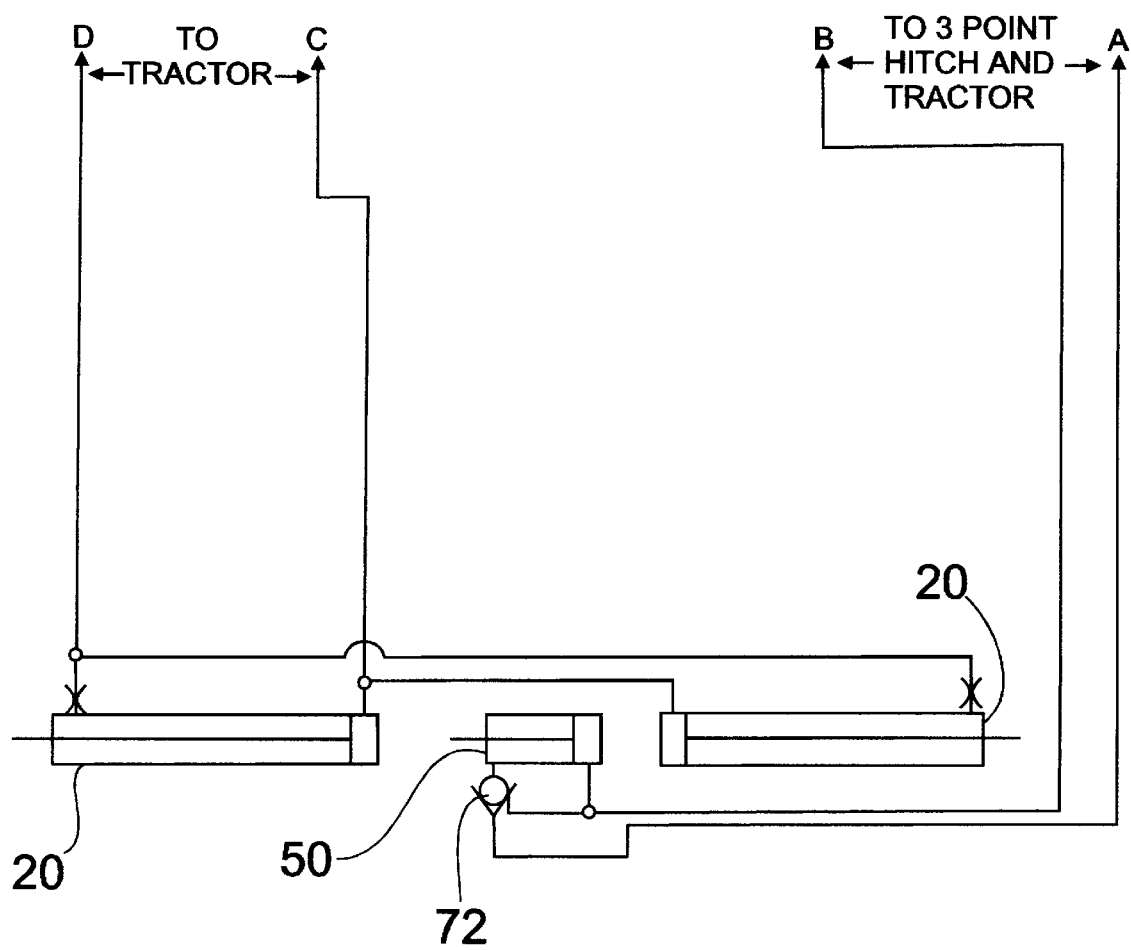
FIG. 2 shows a simple wing lift circuit, i.e. without down pressure capability, with the actuator connected to the implement lift circuit.

In operation without down pressure, (FIG. 2) the wing lift circuit CD can be set to float mode in the tractor when the implement wings 10 and 12 have been lowered from their transport position. After the implement is lowered to the ground, continued flow into line B builds pressure to further operate the implement lift actuators until the depth stop (not shown) is reached. During this period pressure in line B causes pilot-to-open check valve 72 to open to allow flow from the rod end of the cylinder 50, and the headlands system is extended by pressure in line B. This forces the ends of the wing actuators 20 to the outer ends of slots 60 and 62 for extra downward pivotal range of the wings 10 and 12.

The actuators 20 are held at the outer ends of slots 60 and 62 during operation in the working position. When raising the implement at headlands the cylinder 50 is retracted. This limits droop of the wings when the middle section 18 is raised by applying pressure to line A. The implement is typically raised just enough for working tools to clear the ground for turning at the field headlands. The pilot-to-open check 72 prevents fluid from escaping from the cylinder 50 to the rear or front lift actuators which may be extended only to an intermediate position at headlands. The check valve 72 also limits the droop of the wings 10 and 12 until the implement is lowered to the ground and line B is pressurized, repeating the cycle above.

To raise the wings to transport position, the implement is first raised. Pressure is applied to line A, retracting the cylinder 50 and at the same time operating the three point hitch actuators (and rear lift actuators if present) which raise the middle section 18. After the middle section 18 is raised, pressure is applied to line D and the wing actuators 20 rotate wings 10 and 12 to a generally vertical position for transport. The ends of the wing actuators 20 are held at the inner ends of slots 60 and 62 by the cylinder 50. In this held position the headlands actuator motion is completely restricted so that motion of one wing may not be transmitted to the opposite wing through the linkage system when the wings are being raised. Otherwise the wings could freely toggle side to side in the vertical position until they came to rest against some other abutment. Alternately the slots 60 and 62 could be replaced by links pivotally connected to the middle section 18 and end of the wing actuator providing the link's rotation is limited by stops corresponding to the inner ends of the slots of the present embodiment.

In operation with down pressure, (see the hydraulic circuits of FIGS. 3 or 4) the operation of the headlands system is the same. The wing lift circuit may be set to down pressure mode by setting the valve in the tractor to pressurize line C. The down pressure circuit to the wings may be connected in combination with the hydraulic top link 30, or may act alone as in the case of a rigid top link.

A hydraulic top link not connected to a down pressure circuit is known in the prior art for adjusting the angle of an implement relative to a tractor, and remains fixed as a rigid link during operation.

Ball valve 74 (FIGS. 3 or 4) is closed when wings 10 and 12 are raised to the transport position. This allows full tractor pressure to be applied to wing actuators 20 to lower the wings which generally rest past an overcenter position in transport (generally vertical). The ball valve 74 is controlled by a cam or link mechanism so that it is open when the wing position is lower than about 15 degrees up from horizontal as described in the above-noted U. S. patent.

Figure 3:
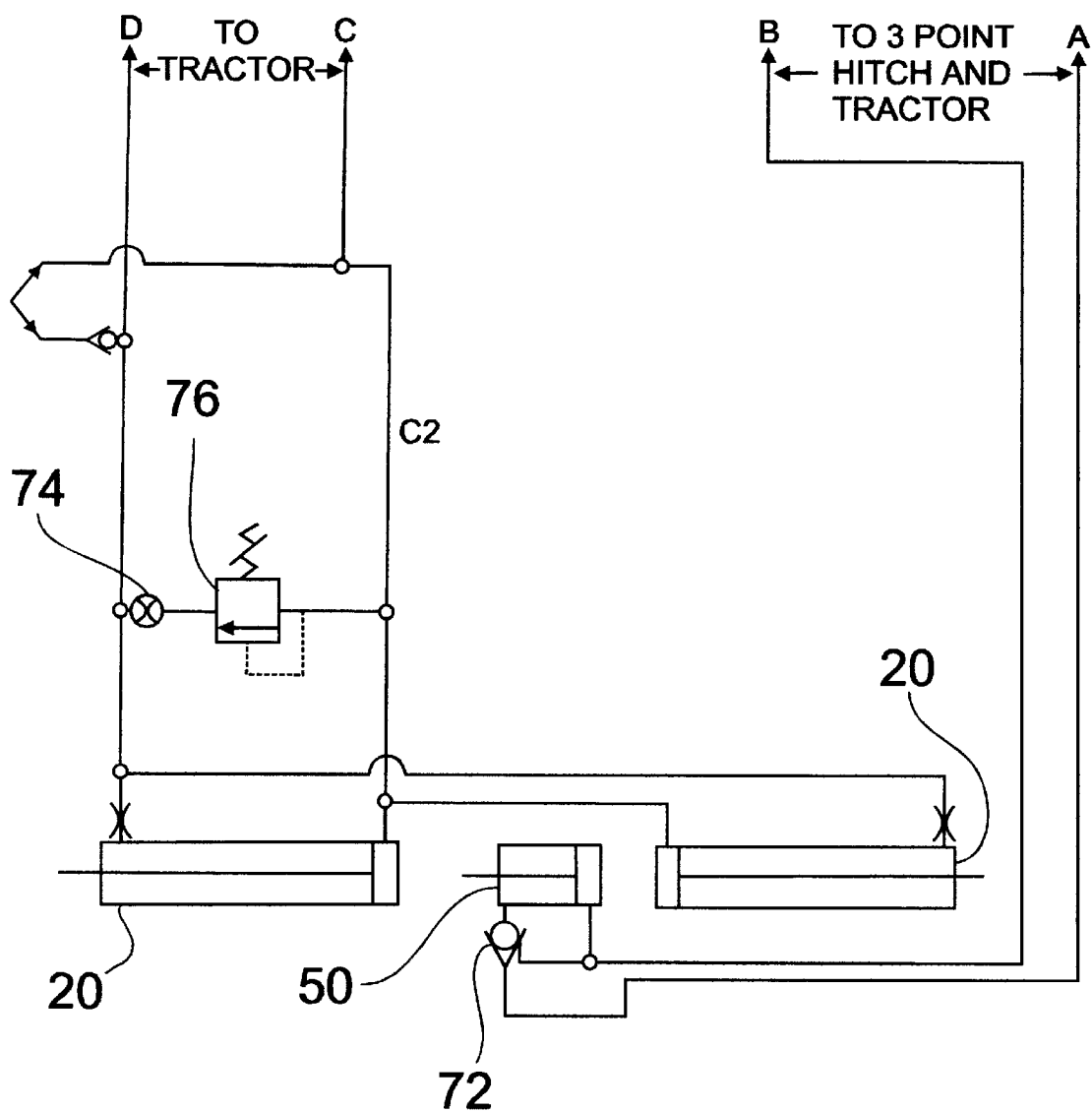
FIG. 3 shows a wing lift circuit with down pressure control in combination with the actuator system.
Figure 4:
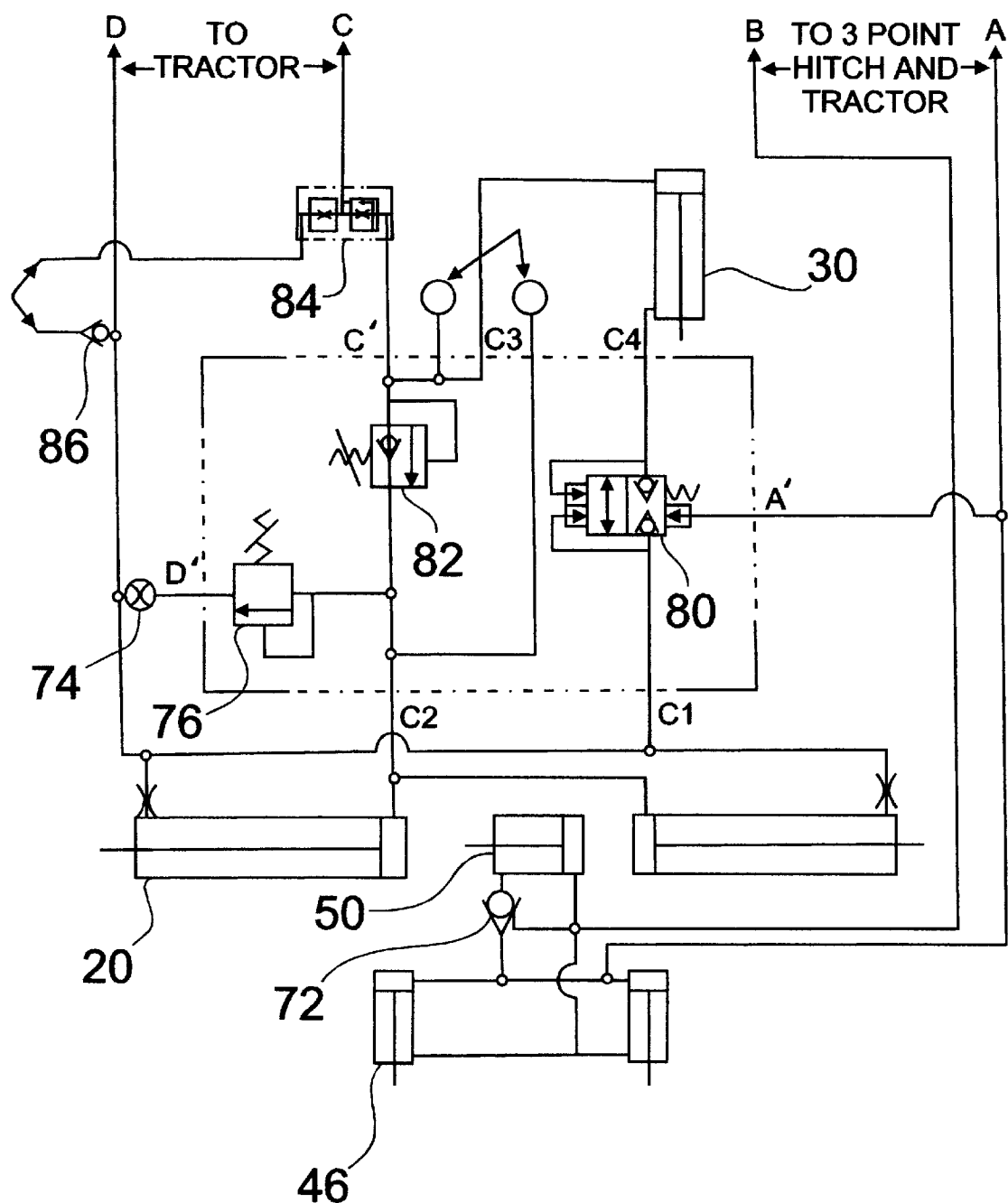
FIG. 4 shows a further hydraulic circuit with additional top link down pressure and wherein the wing down pressure and top link down pressure are controlled separately.

Referring to FIGS. 3 and 4, wing down pressure is controlled by relief valve 76, which limits the pressure in line C2. This relief valve allows fluid to return through line D when pressure in line C2 exceeds the setting. An optional top link actuator may also be connected to line C2 via line C', and pressure to both the wing actuators and the top link actuator may be controlled by valve 76.

With particular reference to FIG. 4, valve 80 is provided when connecting a hydraulic biasing top link to lockout the top link biasing function when the implement is being raised. When the implement is lowered to the set working height there is no pressure in line A or to pilot A', and valve 80 will open with any pressure at C4 or C1 to allow the top link to extend or retract with the biasing function.

A second relief valve 82 (FIG. 4) may be added to the circuit to control the top link pressure separately. This valve may be set at pressures greater than that of relief valve 76 to create a differential pressure between lines C2 and C'.

The valve 82 allows pressure in C' to build higher, before continuing into line C2, where relief valve 76 will control the pressure in that part of the circuit.

This type of down pressure circuit described above which uses relief valves or pressure regulating valves rather than PRRV (pressure reducing-relieving valve) controls is preferred when connecting to tractors having CCLS (closed center-load sensing) controls. The tractor valve controlling this circuit is preferably set to deliver 3 gpm, which generally satisfies the rate at which the various actuators respond to uneven ground. This set flow will continuously pass through circuit CD during operation of down pressure, and be used as required by the actuators when they extend or retract as they provide bias to force the middle section 18 and/or wing sections 10 and 12 toward the ground.

A flow divider 84 can be used to separate equal portions of flow when a second circuit is connected to the same control valve. In this case the tractor valve may be set to 6 gpm. A 50/50 divider will split 3 gpm to each circuit regardless of the pressure at which either circuit is operation. In the embodiment shown in FIG. 4, the second circuit operates hydraulic drives for metering seed or other materials for planting. A check valve 86 in the second circuit blocks reverse flow to the second circuit so that full pressure may be applied to the wing actuators when raising the wings. Depending on the ratio of flow required by the branch circuits, a flow divider with a different split ratio could be used. Or a priority flow divider could be used which sets a fixed flow to one branch and delivers any excess flow to the other. Other multiple number of branch circuits is conceivable by using primary and secondary flow dividers and so on.

Preferred embodiments of the invention have been described and illustrated by way of example. Those skilled in the art will realize that various modifications and changes may be made while still remaining within the spirit and scope of the invention. Hence the invention is not to be limited to the embodiments as described but, rather, the invention encompasses the full range of equivalencies as defined by the appended claims.

Having thus described the invention, what is claimed is:

1. In an agricultural implement having a frame having a pair of tool-carrying wings pivotally mounted thereon for pivotal movement between raised transport positions and lowered ground-working positions; a hydraulic wing actuator connected to each said wing, said hydraulic wing actuator being extendable and retractable for effecting said pivotal motion, the improvement comprising:

a hydraulic wing actuator circuit connected to each of said wing actuators, which circuit, when connected to a tractor hydraulic system, enables said wing actuators to apply down pressure to said wings when the wings are in said lowered working positions, said circuit including a hydraulic pressure control valve having at least one pressure relief valve for controlling the down pressure exerted by said wing actuators and a valve responsive to wing position to disable said at least one pressure relief valve when said wings are raised upwardly beyond said ground-working position.

2. The agricultural implement of claim 1 wherein said wing actuator circuit includes a flow divider to allow the connection of another branch circuit to the same tractor hydraulic system to maintain constant flow to each branch regardless of varying pressure in either branch or between branches.

3. An agricultural implement comprising:

a frame having a pair of tool-carrying wings pivotally mounted thereon for pivotal movement between raised transport positions and lowered ground-working positions, each said wing having a hydraulic wing actuator connected thereto which is extendable and retractable for effecting said pivotal movement;

at least one pressure relief valve for controlling down pressure exerted by said wing actuators;

a hydraulic wing actuator circuit connected to each of said wing actuators, which circuit, when connected to a tractor hydraulic system, enables said wing actuators to apply down pressure to said wings when the wings are in the lowered working positions, said circuit including a ball valve operatively connected to said wings to move to a closed position when said wings are moved to a predetermined position, the movement of said ball valve to a closed position disabling said at least one pressure relief valve; and a flow divider in said wing actuator circuit to allow the connection of another branch circuit to the same tractor control to maintain constant flow to each branch regardless of varying pressure in either branch or between branches.

4. The agricultural implement of claim 3 wherein said ball valve is rotated to said closed position when the wings are raised upwardly beyond the working positions.

5. An agricultural implement comprising:

a frame adapted to be connected to a prime mover;

a pair of tool-carrying wings pivotally-mounted on said frame for pivotal movement between raised transport positions and lowered ground-working positions, each said wing having a hydraulic wing actuator connected thereto which is extendable and retractable for effecting said pivotal motion;

a hydraulic top link actuator secured to said implement frame and adapted to be interposed between said implement frame and said prime mover to apply down pressure to the implement frame;

at least one pressure relief valve for controlling the down pressures exerted by said wing actuators and said top link actuator; and a hydraulic wing actuator circuit connected to each of said wing actuators, which circuit, when connected to a tractor hydraulic system, enables said wing actuators to apply down pressure to said wings when the wings are in the lowered working positions, said circuit further including a ball valve operatively connected to said wings to move to a closed position when said wings are moved to a predetermined position, the movement of said ball valve to said closed position disabling said at least one pressure relief valve.

6. The agricultural implement of claim 5 wherein said hydraulic top link actuator is connected to said wing actuator circuit.

7. The agricultural implement of claim 6 wherein a pair of said relief valves are provided to enable the down pressures exerted by said wing actuators and top link actuator to be controlled separately.

8. The agricultural implement of claim 6 further comprising an implement lift hydraulic circuit adapted to be connected to a lifting system for raising and lowering the implement.

9. The agricultural implement of claim 8 including a valve responsive to wing position to disable the pressure relief valve associated with the wing actuators when the wings are raised upwardly beyond the working positions.

10. The agricultural implement of claim 8 further comprising a flow divider in said wing actuator circuit to allow the connection of another branch circuit to the same tractor control to maintain constant flow to each branch regardless of varying pressure in either branch or between branches.

11. The agricultural implement of claim 5 wherein said ball valve is rotated to said closed position when the wings are raised upwardly beyond the working positions.

12. In an agricultural implement having a frame having a pair of tool-carrying wings pivotally mounted thereon for pivotal movement between raised transport positions and lowered ground-working positions; a hydraulic wing actuator connected to each said wing, said hydraulic wing actuator being extendable and retractable for effecting said pivotal motion, the improvement comprising:

a hydraulic wing actuator circuit connected to each of said wing actuators, which circuit, when connected to a tractor hydraulic system, enables said wing actuators to apply down pressure to said wings when said wings are in said lowered working positions, said circuit including a hydraulic pressure control valve having at least one pressure relief valve for controlling the down pressure exerted by said wing actuators, said circuit further including a ball valve operatively connected to said wings to move to a closed position when said wings are moved to a predetermined position, the movement of said ball valve to said closed position disabling said at least one pressure relief valve;

a hydraulic top link actuator being operatively connected to said hydraulic wing actuator circuit to enable said top link actuator to apply down pressure to said implement frame; and an implement hydraulic circuit adapted to be connected to a lifting system for raising and lowering said implement, said lifting system including a valve to disable the down pressure action of said hydraulic top link actuator when said implement lift circuit is activated to raise said implement.

13. The agricultural implement of claim 12, wherein said hydraulic top link actuator is secured to said implement frame and adapted to be interposed between said implement frame and said prime mover to apply down pressure to said implement frame.

14. The agricultural implement of claim 12, said circuit further including a second pressure relief valve for controlling the down pressure exerted by said top link actuator separately from said wing actuators.

15. The agricultural implement of claim 12, further including a flow divider in said wing actuator circuit to allow the connection of another branch circuit to the same tractor control to maintain constant flow to each branch regardless of varying pressure in either branch or between branches.

16. The agricultural implement of claim 12 wherein said ball valve is rotated to said closed position when the wings are raised upwardly beyond the working positions.

\* \* \* \* \*